United States Patent [19]

van der Lely

[11] 4,083,411

[45] Apr. 11, 1978

[54] SOIL CULTIVATING IMPLEMENTS

[75] Inventor: Ary van der Lely, Maasland, Netherlands

[73] Assignee: C. van der Lely N.V., Maasland, Netherlands

[21] Appl. No.: 716,459

[22] Filed: Aug. 23, 1976

[30] Foreign Application Priority Data

Aug. 29, 1975 Netherlands ......................... 7510211

[51] Int. Cl.² .......................... A01B 63/22; B60D 1/00
[52] U.S. Cl. ..................................... 172/59; 172/117; 172/248; 172/417; 172/386; 280/415 R
[58] Field of Search ................... 172/59, 49, 466, 452, 172/417, 413, 310, 248, 383, 625, 386, 117, 76, 78; 280/415 R, 411 R, 411 A, 411 B

[56] References Cited

U.S. PATENT DOCUMENTS

| | | | |
|---|---|---|---|
| 3,240,005 | 3/1966 | Rowse | 172/310 |
| 3,633,679 | 1/1972 | Dahlberg | 172/417 |
| 3,705,560 | 12/1972 | Lappin | 172/310 |
| 3,885,633 | 5/1975 | Lely | 172/59 |

*Primary Examiner*—Richard J. Johnson

*Attorney, Agent, or Firm*—Mason, Mason & Albright

[57] ABSTRACT

An implement has at least one group of soil working members arranged in a row that extends transverse to the direction of travel. The group of members is carried on an elongated frame portion that is connected to an overlying supporting structure by parallelogram linkages. Fore and aft ground wheels on corresponding arms interconnect the wheels to beams of the structure and the arms for the front wheels form part of further parallelogram structures. A hydraulic piston assembly bridges each rear arm to an upper arm link of a further parallelogram linkage so that the arms can be pivoted and the supporting structure together with the frame portion with soil working members, are raised to a transport position. The wheels can each be adjusted about a vertical axis to support the implement, in part, during operation or entirely during transport. Respective coupling members are attached to the front and the side of the implement for towing same in either position. Stops and adjusting devices interconnect the various arms and linkages to limit and adjust the position of the frame portion and supporting structure with respect to the arms.

11 Claims, 6 Drawing Figures

SOIL CULTIVATING IMPLEMENTS

According to the invention, there is provided a soil cultivating implement of the kind set forth, wherein the supporting frame is provided with at least three ground wheels whose planes of rotation are angularly displaceable about corresponding upwardly extending axes, means being provided by which the plane of rotation of each of at least said three ground wheels can be retained in at least one angular position about the corresponding upwardly extending axis, and wherein the supporting frame and the ground wheels are upwardly and downwardly displaceable in level relative to each other.

For a better understanding of the invention, and to show how the same may be carried into effect, reference will now be made, by way of example, to the accompanying drawings, in which.

Referring to the drawings, the soil cultivating implement that is illustrated therein is in the form of a rotary harrow which has a supporting frame 1 that extends substantially horizontally transverse, and usually substantially horizontally perpendicular, to the intended direction of operative travel of the implement which is indicated in FIGS. 1 to 4 of the drawings by an arrow A. The supporting frame 1 includes four frame beams 2 that are in parallel and spaced apart relationship with one another, there being an upper pair of the beams 2 and a lower pair of the beams 2 with the two beams 2 of the lower pair spaced apart from one another in the direction A by a greater distance than are the two beams 2 of the upper pair (see FIGS. 2 and 3). Each of the four beams 2 has a polygonal cross-section which it is preferred should be the square cross-section that is illustrated in the accompanying drawings and it will be seen from FIGS. 2 and 3 of those drawings that, with the preferred square cross-section, each hollow beam 2 is arranged so that a diagonal between two of its opposite corners is vertically or substantially vertically disposed while the relatively perpendicular diagonal between its other two corners is horizontally or substantially horizontally disposed. Each set of four corresponding ends of the four beams 2 is rigidly connected to a corresponding substantially vertically disposed side plate 3 that is in parallel or substantially parallel relationship with the direction A. Moreover, the frame beams 2 are rigidly interconnected by supports 4 at locations between their opposite ends. Substantially vertically disposed plates 5 of approximately trapezoidal configuration are secured to the lowermost and leading, with respect to the direction A, frame beam 2 at two locations which are spaced by short distances from the opposite ends of that beam and at two further locations that are spaced by short distances from opposite sides of the midpoint of the beam. Upper and lower horizontal pivots connect the upper and lower leading corners of the four plates 5 to the leading ends of pairs of links 6 that extend rearwardly from said pivots alongside the opposite surfaces of the corresponding plates 5. The rearmost ends of the links 6 are coupled by further parallel pivots to upper and lower locations on corresponding substantially vertically disposed plates 7 that are of approximately right-angled triangular configuration. It will be evident that the links 6 form parts of parallelogram linkages by which the plates 7 can be moved upwardly and downwardly, without significant tilting, relative to the plates 5.

There are four of the plates 7 two of which are secured to the top of one hollow frame portion 8 while the other two are secured in a substantially symmetrically identical manner to the top of a second hollow frame portion 8. The two hollow frame portions 8 both extend substantially horizontally parallel to the length of the supporting frame 1 and it will be noted that their neighbouring ends are in very closely adjacent relationship with one another at a location midway across the width (perpendicular to the direction A) of the implement. Each hollow frame portion 8 supports a corresponding group of twelve rotatable soil working or cultivating members 9, the members 9 of each of the two group being arranged in a corresponding row in such a way that, during normal operation on flat land, the two rows substantially adjoin one another in substantially axially coincident relationship. Although, in the embodiment which is being described, each group of rotatable soil working or cultivating members 9 comprises 12 of those members, it is emphasized that this number is by no means mandatory and that it is possible to employ lesser, or even greater, numbers of members 9 per group. The axis of rotation of each soil working or cultivating member 9 is a substantially vertical, or at least upwardly extending, axis that is embodied in a corresponding shaft, the members 9 being secured to the lowermost ends of said shafts which ends project from beneath the bottom of the hollow frame portion 8 concerned. Each member 9 comprises a horizontally or substantially horizontally disposed support that is rigidly connected, at its midpoint, to the shaft which embodies its axis of rotation, the support being provided at substantially its opposite ends with two sleeve-like tine holders in which fastening portions of corresponding rigid soil working tines are firmly, but releasably, secured. Each of the rigid soil working tines has a downwardly extending soil working portion that is in inclined relationship with the corresponding fastening portion, the arrangement being such that said soil working portions trail rearwardly from top to bottom by a few degrees with respect to the intended directions of operative rotation of the corresponding soil working or cultivating members 9. The shafts which embody the axes of rotation of the members 9 are provided, inside the hollow frame portions 8, with straight-toothed or spur-toothed pinions 10 whose dimensions and arrangement are such that the teeth of each pinion 10 are in mesh with those of its neighbour, or of both of its neighbours, in the row thereof that corresponds to the hollow frame portion B under consideration. Thus, during operation, each pinion 10, and the corresponding member 9, will rotate in a direction that is opposite to its neighbour, or both of its neighbours, in the same group.

One of the center pair of the row of twelve shafts that embody the axes of rotation of the twelve members 9 in each group is extended upwardly through the top of the corresponding hollow frame portion 8 into the interior of a corresponding gear box 11 that is mounted on top of that hollow frame portion 8. Shafts and pinions inside each gear box 11 place each upward shaft extension in driven connection with a rotary input shaft of that gear box 11 that projects substantially horizontally therefrom towards the center of the implement, each gear box 11 being provided with a corresponding change-speed gear 12 that can be employed to select any chosen one of a number of different transmission ratios between the rotary input shaft of the gear box 11 under consideration and the upward extension of the shaft that embodies the axis of rotation of one of the soil working or cultivating members 9 of the corresponding group. Telescopic transmission shafts 13 having universal joints at their opposite ends place the rotary input shafts of the two gear boxes 11 in driven connection with horizontally aligned rotary output shafts of a central gear box 14 of the implement which central gear box 14 is rigidly secured to the supporting frame 1 rather than to either of the hollow frame portions 8. The central gear box 14 is provided with a rotary input shaft that projects from the front thereof in substantially the direction A, said rotary input shaft being placed in driven connection, inside the gear box 14, with its two output shafts. As will be further explained below, the rotary input shaft of the central gear box 14 is arranged to be placed in driven connection with the power take-off shaft of an agricultural tractor or other operating vehicle when the implement is in use.

Substantially vertically disposed end plates 15 of the two hollow frame portions B are each provided, close to the top and at the front with respect to the direction A, with a horizontal stub shaft 16 and an arm 17 is turnable upwardly and downwardly about each stub shaft 16 alongside the corresponding end plate 15. The arms 17 extend rearwardly alongside the plates 15 from the stub shafts 16 and each arm 17 can be retained in a chosen angular position about the axis defined by the pair of stub shafts 16 that is carried by the corresponding hollow frame portion 8 by a bolt 8 that is connected to said arm 17 and that is entered through an arcuate slot 19 formed in the corresponding end plate 15 at a location close to the rearmost edge of that end plate, the center of curvature of the slot 19 being coincident with the axis defined by the corresponding pair of stub shafts 16. It will be evident that, once the bolts 18 are tightened, the arms 17 are releasably fixed in the angular positions relative to the hollow frame portions 8 that are dictated by the positions of said bolts 18 along the slots 19. The rearmost ends of the arms 17 with respect to the direction A are provided with downwardly and rearwardly inclined brackets and, for each of the two pairs of arms 17 that correspond to the two hollow frame portions 8, a corresponding rotatable supporting member in the form of a ground roller 20 is rotatably mounted between the two brackets that are carried by the two arms 17 concerned. The brackets carry substantially horizontally aligned bearings in which are received stub shafts at the opposite ends of central tubular supports 21 of the two rollers 20. Each roller 20 is mounted in a freely rotatable manner, its central tubular support carrying a plurality of regularly spaced apart substantially circular support plates that are substantially parallel to one another and to the direction A. Each support plate is formed, close to its periphery, with a plurality, such as sixteen, of holes that are regularly spaced apart from one another around the longitudinal axis of the corresponding central tubular support 21 and it will be seen from FIGS. 2, 3 and 6 of the drawings that a number, such as eight, of elongate elements 22 are entered through the peripheral holes in the successive support plates so as to be wound helically around the axis of rotation of the corresponding roller 20 to some extent. As illustrated in the drawings, only every second one of the peripheral holes in each support plate of each roller 20 is used to receive one of the elongate elements 22.

Each of the plates 7 that is secured to the top of one of the hollow frame portions 8 is connected by a corresponding pivot located close to its lowermost and rearmost corner to the lowermost end of a corresponding upwardly and rearwardly inclined arm 23. Each arm 23 is formed towards its uppermost end with a longitudinally extending slot 24 that terminates, at its uppermost end, at substantially the level of the rearmost of the upper pair of frame beams 2. Each slot 24 has a pin 25 entered movably through it, said pins 25 being fastened to brackets 26 that are rigid with the frame beam 2 that has just been mentioned at appropriate locations along the length of that frame beam. Each arm 23 has a corresponding latch 27 pivotably connected to it at a location immediately above the uppermost end of the corresponding slot 24 and it will be seen from a comparison between FIGS. 2 and 3 of the drawings that each latch 27 can be turned into a position, relative to the corresponding arm 23, which is such that its lower end bears against an upper surface of the corresponding bracket 26 so as to prevent the slot 24 of the associated arm 23 from sliding downwardly over the corresponding pin 25. The latches 27, when operative, thus limit the distance which the hollow frame portions 8 can move downwardly relative to the supporting frame 1.

The outer end of each hollow frame portion 8 that is remote from the center of the implement is provided with a corresponding pivotably mounted arm 28 that is of flat-bottomed U-shaped configuration as seen in plan view (FIG. 1), the two limbs of each arm 28 extending substantially parallel to the direction A with the base foremost in that direction and the limb thereof that is nearest to the center of the implement of greater length than the limb thereof that is furthest from the center of the implement. The inner and longer limb of each arm 28 is turnably mounted on top of the corresponding hollow frame portion 8, the turnable mountings being such as to define an axis that extends substantially horizontally parallel to the direction A. The base of each arm 28 is disposed forwardly of the corresponding hollow frame portion 8 with respect to the direction A while the shorter limb thereof is disposed outwardly beyond the neighbouring end of the associated hollow frame portion 8 where it is secured to the upper edge of a corresponding shield plate 29 that extends substantially vertically and substantially parallel to the direction A. The lowermost edge of each shield plate 29 is shaped to slide forwardly in the direction A over the ground surface during the operation of the implement, each shield plate 29 being turnable upwardly and downwardly about the axis that coincides with the longer limb of the corresponding arm 28 so that said shield plate can match undulations in the surface of the ground that is being worked by the implement during the operation of the latter.

Figure 2:
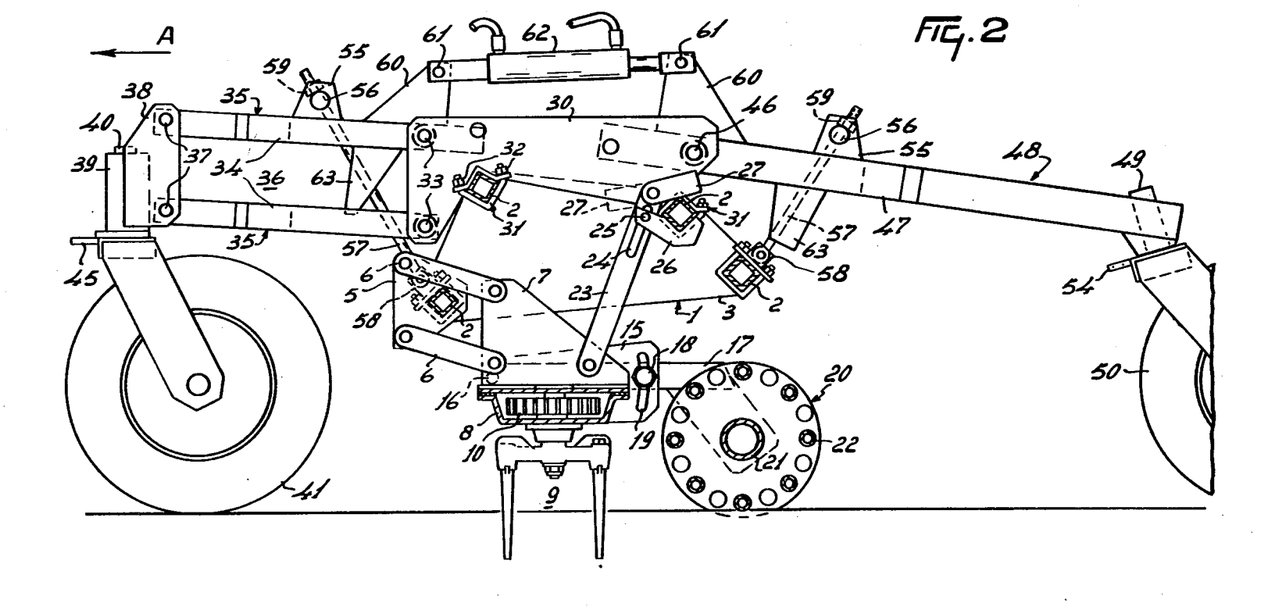
FIG. 2 is a section, to an enlarged scale, taken on the line II—II in FIG. 1 with the implement in an operative position, FIG. 3 corresponds to FIG. 2 but illustrates all but ground wheels of the implement in an operative transport position.
Figure 3:
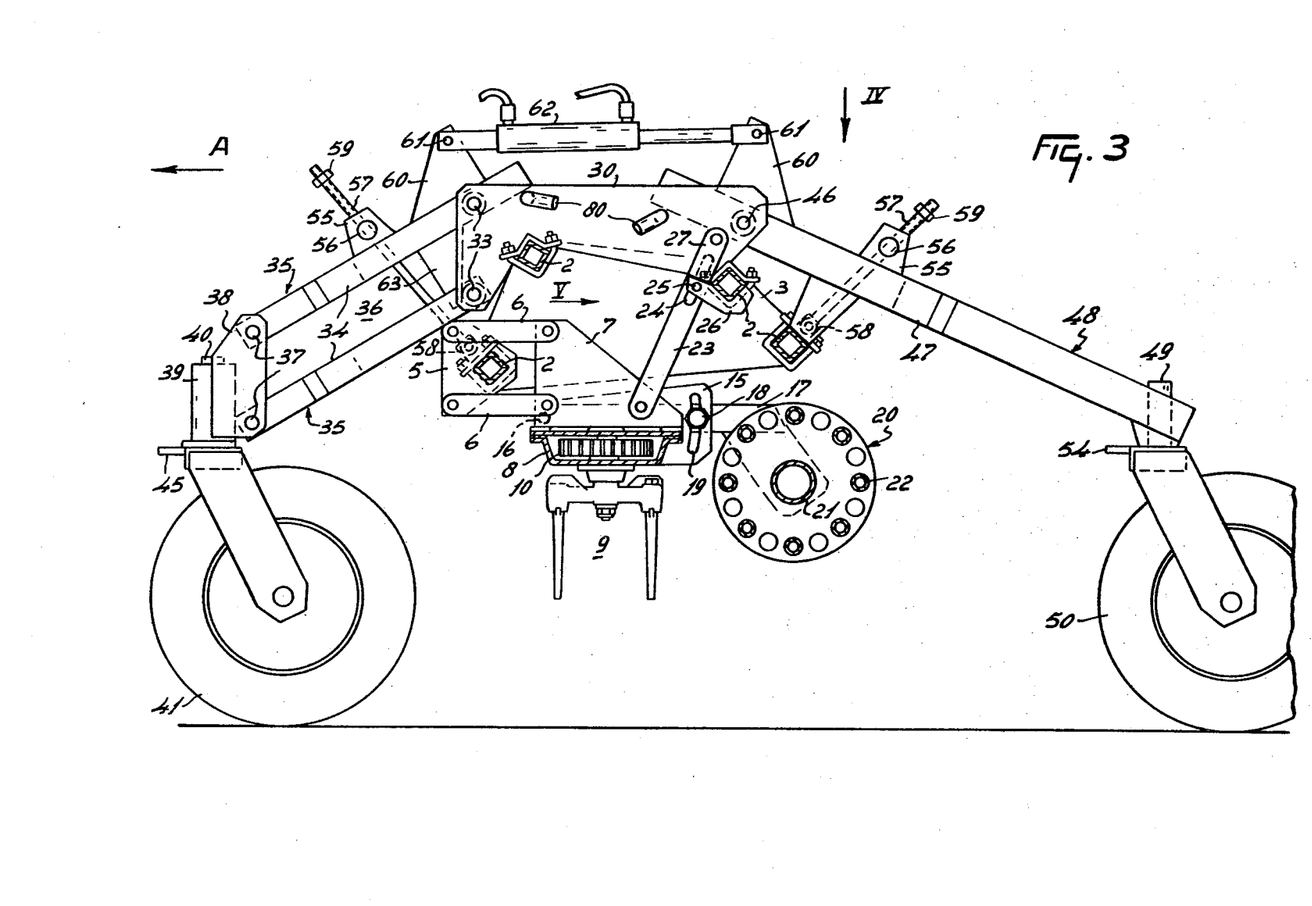

Two pairs of identical support plates 30 are fastened to the upper pair of frame beams 2 at two locations which are spaced by equal distances along the frame beams 2 from the center of the implement, the two plates 30 of each pair being parallel to one another but being spaced apart by a short distance along the frame beams 2. As can be seen in FIGS. 2 and 3 of the drawings, the substantially vertically disposed support plates 30 are, in fact, releasably secured to the beams 2 by right-angled clamps 31 which co-operate with brackets carried by the plates 30 themselves by way of short screwthreaded stub shafts provided with nuts 32. Forks 34 that form parts of corresponding upper and lower arms 35 are turnably mounted between the leading ends, with respect to the direction A, of the two support plates 30 of each pair by horizontally aligned upper and lower pivot pins 33. The arms 35 form parts of corresponding parallelogram linkages 36 and leading unforked regions thereof are connected by upper and lower substantially horizontal pivot pins 37 to upper and lower locations on corresponding pairs of substantially vertically disposed lugs 38. Each pair of lugs 38 is secured in parallel relationship to the opposite sides of a corresponding cylindrical sleeve 39, said sleeve 39 being substantially vertically disposed and having a corresponding substantially vertical shaft 40 turnably mounted therein. The lowermost end of each shaft 40 that projects from beneath the bottom of the corresponding sleeve 39 is fastened to the top of the forked mounting of a corresponding castor ground wheel 41. Each sleeve 39 also carries a horizontally projecting lug 42 (FIG. 4) the lug being formed with a hole through which can be entered a corresponding vertical locking pin 43 in such a way that the tip of that locking pin can co-operate with either chosen one of two different holes 44 in a further substantially horizontal lug 45 that is, however, rigidly connected to the shaft 40 concerned and thus to the mounting of the corresponding castor ground wheel 41. Each pair of holes 44 is angularly spaced apart by substantially 90° around the upright longitudinal axis of the corresponding shaft 40 and it will be appreciated that each locking pin 43 can be employed to retain the plane of rotation of the corresponding ground wheel 41 in either one of two different angular positions about the axis of the corresponding shaft 40, those two positions being shown respectively in full lines and in broken lines in the drawings.

At the rear of the supporting frame 1 with respect to the direction A, forks 47 that form parts of arms 48 are turnably mounted between the two support plates 30 of each pair by horizontally aligned pivot pins 46. The arms 48 extend generally rearwardly from the support plates 30 with respect to the direction A and the rearmost ends thereof turnably support corresponding upwardly extending, but only occasionally strictly vertical, shafts 49. The lowermost end of each shaft 49 is secured to the forked mounting of a corresponding castor ground wheel 50 and it will be seen from FIGS. 2, 3 and 4 of the drawings that each arm 48 carries a lug 51 formed with a hole for the reception of a corresponding locking pin 52 whose tip can be entered into either chosen one of two holes 53 that are formed through a lug 54 that is rigidly connected to the corresponding shaft 49 and thus to the mounting of the corresponding castor ground wheel 50. The two holes 53 in each lug 54 are spaced apart from one another around the longitudinal axis of the corresponding shaft 49 by substantially 90° so that, in a similar manner to the ground wheels 41, the locking pins 52 can be employed to retain the planes of rotation of the rear castor ground wheels 50 in either the angular positions that are shown in full lines in the drawings or the angular positions that are shown in broken lines relative to the longitudinal axes of the shafts 49.

Each upper fork 34 carries horizontally registering vertically disposed lugs 55 on its upper edges at a distance from the corresponding upper pivot pin 33 and a corresponding block 56, provided with trunnion pins, is turnably mounted between those lugs 55. Each block 56 is formed with a transverse hole and a corresponding rod 57 is entered through that hole, the lowermost and rearmost end of said rod with respect to the direction A being turnably connected to lugs 58 that are clamped to the leading frame beam 2 of the lower pair thereof. At least an upper end region of each rod 57 is screwthreaded and is provided with a nut 59 that co-operates, in the manner of a stop, with the corresponding block 56 so as to enable the effective length of that rod 57 to be adjusted as may be required. It will be seen from FIGS. 2 and 3, in particular, of the drawings, that the rearmost beam 2 of the lower pair of beams 2 is similarly connected to the forks 47 of the two arms 48 by sets of parts 55, 56, 57, 58 and 59 that are identical to the corresponding parts that have just been described with the sole exception that, in this case, the rods 57 are somewhat shorter in length than are the rods that have already been referred to. The position of the supporting frame 1 relative to the arms 35 and 48 can thus be controlled in the working position of the implement that is illustrated in FIG. 2 of the drawings by appropriate adjustments of the stop nuts 59 lengthwise along the screwthreads of the rods 57. Upwardly convergent pairs of generally triangular supports 60 are provided above the pivotal mountings of the forked arms 35 and 48, the apices of said supports 60 being pivotally connected by parallel substantially horizontally disposed pins 61 respectively to the base of the cylinder of a double-acting hydraulic piston and cylinder assembly 62 and to the free end of the piston rod of that assembly 62. Stops 63 are secured to the lower edges of the forks 34 of the upper arms 35 and to the forks 47 of the arms 48, respectively, said stops 63 being arranged to bear against the lower pivot pins 33 and the lower rearmost frame beam 2, respectively, when the suppporting frame 1 is raised to bring the implement into its inoperative transport position as shown in FIG. 3 of the drawings.

Figure 1:
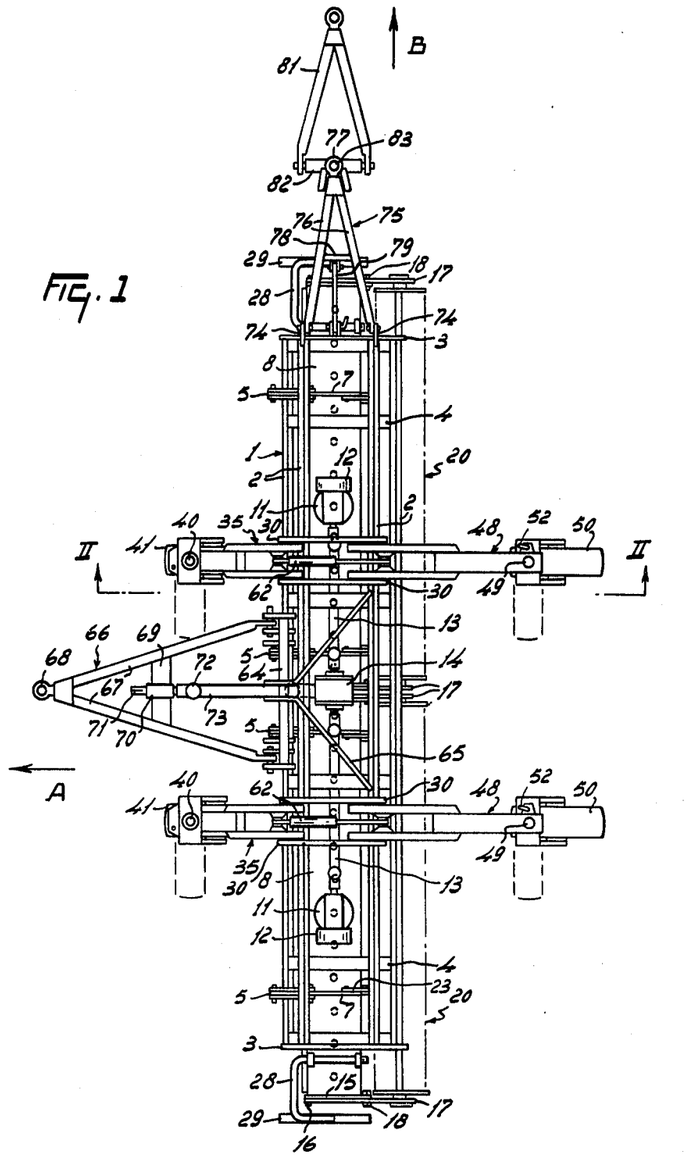
FIG. 1 is a plan view of a soil cultivating implement in accordance with the invention, the implement being illustrated in both an operative position and a position suitable for the inoperative transport thereof.

A central region of the supporting frame 1 is provided, between the parallelogam linkages 36, with a coupling member or trestle 64 that is of generally triangular configuration when viewed in front or rear elevation, the apex of said coupled member or trestle 64 being connected to the upper rear frame beam 2 of the supporting frame 1 by a pair of tie beams 65 which extend in downwardly and rearwardly divergent relationship from the member or trestle 64 to said beam 2 with respect to the direction A. In the implement that is illustrated in the drawings by way of example, coupling points at the opposite ends of the base of the member or trestle 64 are pivotally connected to the ends of two beams 67 that form parts of a draw bar 66. As shown in FIG. 1 of the drawings, the beams 67 of the draw bar 66 are forwardly convergent in the direction A and are provided at their leading rigid junction with a towing eye 68. A connecting strip 69 rigidly interconnects the two beams 67 at locations approximately midway along the lengths of those beams so that, as seen in plan view, (FIG. 1), the whole draw bar 66 is substantially A-shaped. The top of the connecting strip 69 carries, at its center, a rotary bearing 70 in which bearing a shaft 71 is rotatably mounted. The rearmost end, with respect to the direction A, of the rotary shaft 71 is coupled by a universal joint 72 to the leading end of a telescopic transmission shaft 73 which is of a construction that is known per se, the rearmost end of said shaft 73 being, in turn, connected to the forwardly projecting rotary input shaft of the central gear box 14 by a further universal joint, The arrangement is such that the leading splined or otherwise keyed end of the shaft 71 can be placed in driven connection with the power take-off shaft of an agricultural tractor or other operating vehicle by way of a further telescopic transmission shaft (not shown) of a construction that is known per se having universal joints at its opposite ends. A second draw bar 75 is mounted at one end of the supporting frame 1 to which frame it is connected by substantially horizontally aligned pins (defining an axis that is substantially parallel to the direction A) carried by a pair of spaced lugs 74 mounted at the top of the corresponding end plate 3 of the supporting frame 1. The second draw bar 75 comprises two beams 76 that extend in convergent relationship away from the lugs 74, the rigid junction between the ends of said beams 76 that are remote from the lugs 74 being provided with a towing eye 77. The two beams 76 are interconnected, at substantially their midpoints by a strip 78 so that the second draw bar 75, like the larger first draw bar 66, is substantially A-shaped as seen in the plan view of FIG. 1. However, in this case, that side of the connecting strip 78 which is closest to the supporting frame 1 has one end of an arm 79 pivotably connected to it, the opposite end of said arm 79 being releasably coupled to the neighboring end plate 3 by a pair of apertured lugs and a co-operating locking or retaining pin. When the arm 79 operatively interconnects the end plate 3 and the strip 78 as shown in FIG. 1 of the drawings, the general plane of the draw bar 75 is inclined to the horizontal in an outward and downward manner so that the ends of its beam 76 that are pivotally connected to the lugs 74 are at a higher horizontal level than is the towing eye 77 at the interconnected opposite ends of those beams.

The soil cultivatung implement that has been described has two substantially axially aligned groups of the rotary soil working or cultivating members 9 in which each of those members 9 is rotatable about a corresponding substantially vertical, or at least upwardly extending, axis. When the implement is in operation, the towing eye 68 at the front of its first draw bar 66 is connected to a towing hook, hitch pin or the like at the rear of an agricultural tractor or other operating vehicle and the leading splined or otherwise keyed end of the shaft 71 is placed in driven connection with a power take-off shaft at the rear of that tractor or other vehicle through the intermediary of a telescopic transmission shaft of a construction that is known per se (not shown) having universal joints at its opposite ends. This enables the soil working or cultivating members 9 to be rotated through the intermediary of the transmission that has been described, and that is illustrated in the accompanying drawings, each of the two group of members 9 being movable upwardly and downwardly relative to the supporting frame 1, and independently of the other group, by virtue of the parallelogram linkages, comprising the links 6, by which the hollow frame portion 8 of the group concerned is coupled to the supporting frame 1. The leading castor ground wheels 41 and rear castor ground wheels 50 occupy the positions thereof that are shown in full lines in FIG. 1 of the drawings and the positions illustrated in FIG. 2 at this time. Each soil working or cultivating member 9 works an individual strip of land that extends substantially parallel to the direction A but the distance between the tips of the soil working portions of the two tines of each member 9 is a little greater than is the distance between the axes of rotation of the shafts upon which the pinions 10 are mounted, this latter distance conveniently, but not essentially, having a magnitude of substantially 25 centimeters. The depth to which the tines of the members 9 can penetrate into the soil is controlled principally by the level of the axis of rotation of the corresponding immediately following ground roller 20 relative to that of the hollow frame portion 8 concerned, this level being adjustable, for each group of the members 9, by turning the corresponding arms 17 upwardly or downwardly about the axis defined by the associated stub shafts 16 and subsequently tightening the bolts 18 to maintain the chosen setting. The two groups of members 9 are in such closely neighbouring relationship at the center of the implement that the broad strips of land that are worked by the two groups overlap, or at least adjoin, to form, in effect, a single broad strip of worked soil which, in the case of the embodiment that has been described and that is illustrated in the accompanying drawings, has width of substantially 6 meters. Thus, each individual group of soil working or cultivating member 9 has a working width of substantially 3 meters.

During operation, when the implement travels in the direction A, the planes of rotation of all four of the ground wheels 41 and 50 are freely angularly displaceable about the axes of the corresponding shafts 40 and 49, the corresponding locking pins 43 and 52 remaining inactive. It will be noted from the drawings that the arms 48 are of considerably greater length than are the arms 35 in the direction A so that, as seen in plan view, the rear ground wheels 50 are spaced significantly further from the longitudinal axis (perpendicular to the direction A) of the supporting frame 1 than are the leading ground wheels 41. In fact, in the illustrated embodiment, the distance between the axles of the rear ground wheels 50 and the longitudinal axis of the supporting frame 1 is not less than twice the distance between the axles of the leading ground wheels 41 and the same axis when the implement is operatively disposed. The greater spacing between the rear ground wheels 50 and the supporting frame 1 provides the possibility of connecting to said frame 1 other implements or machines such as seed drills or machines for applying artificial fertilisers and other materials into and/or onto the soil. When the implement is to be brought from its operative position to the position thereof that is suitable for inoperative transport (i.e. from the position of FIG. 2 to the position of FIG. 3), the latches 27 are first turned from the positions thereof that are shown in full lines in FIG. 2 to the positions thereof that are shown in broken lines in the same Figure and in full lines in FIGS. 3 and 5. These latter positions of the latches 27 are such that, upon the arms 35 and 48 turning downwardly about the axles of the corresponding ground wheels 41 and 50 from a raised position such as the one shown in FIG. 3, the latches will come into contact with the corresponding stop brackets 26 so that no further downward turning movement will be possible (see FIGS. 3 and 5 of the drawings). The arms 35 and 48 are turned downwardly about the pivot pins 33 and 46 to raise the supporting frame 1 from the position shown in FIG. 2 to that shown in FIG. 3 by manipulating the controls of the hydraulic system of the operating tractor or other vehicle to extend the piston rods of the two hydraulic piston and cylinder assemblies 62 (compare FIGS. 2 and 3). The stops 63 are provided to prevent an excessive downward displacement of the arms 35 of the parallelogram linkages 36 or of the arms 48 in the event of an adverse or irregular distribution of weight, said stops 63 co-operating with the rearmost lower frame beam 2 and with the lower pivot pins 33 when the limit positions of the downward displacements of the arms 35 and 48 are reached. The position illustrated in FIG. 3 of the drawings is initially maintained by the hydraulic piston and cylinder assemblies 62 but, once that position has been reached, locking pins 80 are entered through horizontally aligned holes in the pairs of support plates 30 whereafter the assemblies 62 can be relieved of pressure. The arms 35 and 48 then turn downwardly to a small extent about the pivot pins 33 and 46 until inner ends of the upper arms 35 and inner ends of the arms 48 come into abutting relationship with the locking pins 80 between the support plates 30 (see FIG. 3). Once the position illustrated in FIG. 3 is reached, the plane of rotation of each of the four ground wheels 41 and 50 can be turned through substantially 90° into the position thereof that is shown in broken lines in FIGS. 1 and 4 of the drawings. The locking pins 43 and 52 are then employed to prevent castoring and to retain the planes of rotation of the ground wheels in the illustrated broken line positions. The draw bar 66, together with the shafts 71 and 73, can, after disconnection from the operating tractor or other vehicle, be tilted upwardly through substantially 90° to an inoperative position in which it is maintained by a simple known retaining member that is not illustrated or, alternatively, by a length of chain, cable, rope or the like.

In order to tow the implement in the direction B (FIGS. 1 and 4) when it has been brought to its inoperative transport position as described above, a third draw bar 81 is provided. The third draw bar 81 is pivotable about a substantially vertical shaft 83 that is coupled to a beam 82 (that extends perpendicular to the direction B) provided at the leading end of the second draw bar 75. It will be noted that the supporting frame 1 can be used in an implement which is not provided with ground wheels, such implement being connected to an agricultural tractor or other vehicle for operational purposes by the coupling member or trestle 64 which then co-operates with a three-point lifting device or hitch carried by that tractor or other vehicle. When the supporting frame 1 forms part of an implement of this kind, auxiliary ground wheels are provided near the end of the frame that is remote from the second draw bar 75 to enable it to be towed in the direction B. However, the second draw bar 75 is disposed at too high a horizontal level for direct co-operation with a towing hook, hitch pin or the like of a tractor or other towing vehicle when the supporting frame 1 forms part of an implement of the kind that has been described and illustrated which implement includes the four ground wheels 41 and 50. The leading end of the third draw bar 81 is, however, disposed at the correct level and will co-operate with a towing hook, hitch pin or the like to enable the implement to be towed by a tractor or other vehicle in the direction B on its own ground wheels 41 and 50, suitably disposed as illustrated in broken lines. It is advantageous for manufacturing purposes to be able to use the same supporting frame 1 both for an implement which has its own ground wheels and for an implement which is intended, during operation, to be supported by the three-point lifting device or hitch of a tractor or other operating vehicle instead of by ground wheels.

Figures 4, 5, 6:
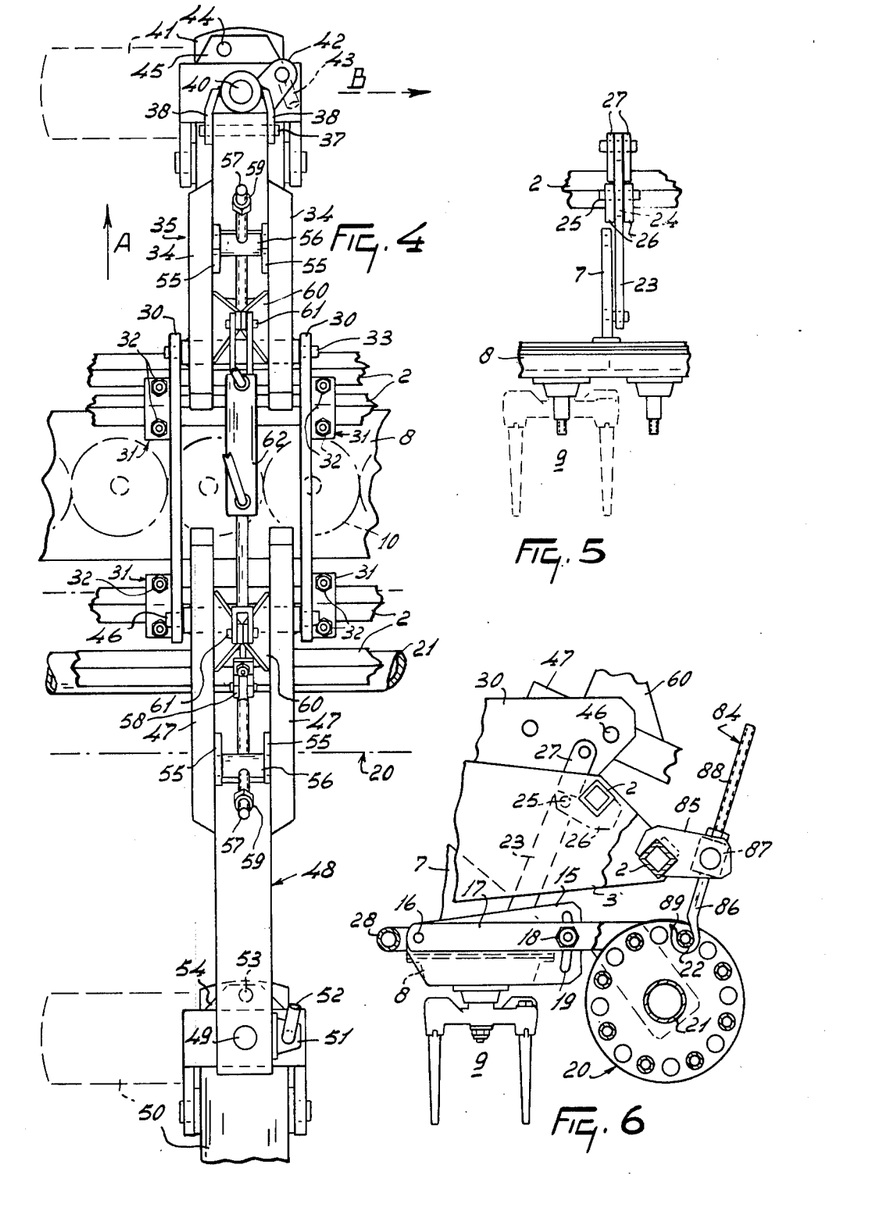
FIG. 4 is a plan view as seen in the direction indicated by an arrow IV in FIG. 3.
FIG. 5 is an elevation as seen in the direction indicated by an arrow V in FIG. 3.
FIG. 6 is a part-sectional side elevation illustrating the construction and mode of use of an adjusting mechanism by which the level of rotatable supporting members of the implement can be changed, when required, relative to the level of the remainder of the implement.

The two ground rollers 20 that afford rotatable supporting members of the implement that has been described are of considerable weight and their upward and downward adjustment in level relative to the hollow frame portions 8 entails the use of a lot of energy. An adjusting mechanism 84 (FIG. 6) is accordingly provided to facilitate such adjustment. The mechanism 84 comprises a hook 85 that can be releasably coupled to the lowermost and rearmost (with respect to the direction A) frame beam 2 as shown in FIG. 6. The adjusting mechanism 84 comprises a rod 86 that is entered slidably through a hole in a block 87, the block being pivotally connected to the hook 85 by aligned trunnion pins. The lowermost end of the rod 86 is provided, beneath the block 87, with a hook 89 that is shaped to co-operate with one of the elongate elements 22 of either roller 20 in the simple manner that can be seen in FIG. 6 of the drawings. A major portion of the length of the rod 86 is formed, commencing at the end thereof remote from the hook 89, with a screwthread 88 and a nut is mounted on said screwthread to abut against the upper surface of the pivotally mounted block 87. When raising or lowering of the rollers 20 relative to the hollow frame portion 8 is required, the hook 85 is engaged with the lowermost and rearmost (with respect to the direction A) frame beam 2 at a location vertically in register with substantially the middle of the axial length of the roller concerned. The hook 89 is then engaged with one of the elongate elements 22 of that roller 20 in the manner that is visible in FIG. 6 after which the corresponding bolts 18 are loosened. It will be seen that the application of a spanner or wrench to the nut that is mounted on the screwthread 88 of the rod 86 will enable that nut to be turned in an appropriate direction to slowly raise, or slowly lower, the roller 20 concerned, the corresponding arms 17 turning upwardly or downwardly about the axis defined by the corresponding stub shafts 16. When the required level has been reached, the bolts 18 are tightened to maintain the roller 20 bodily at that level and the nut on the screwthread 88 of the rod 86 is loosened to enable the adjusting mechanism 84 to be removed from the implement.

Although various features of the soil cultivating implement that have been described and/or that are set forth in the accompanying drawings will be set forth in the following claims as inventive features, it is emphasised that the invention is not necessarily limited to those features and that it includes within its scope each of the parts of the soil cultivating implement that have been described, and/or that are illustrated in the accompanying drawings, both individually and in various combinations.

What we claim is:

1. A rotary harrow comprising a frame and a plurality of soil working members rotatably mounted on said frame and driving means connected to rotate said members, said soil working members being arranged in two adjoining groups and each group being carried by a corresponding hollow frame portion, an elongated supporting frame overlying the frame portions and means linking the frame portions to said supporting frame, said harrow being positionable in an operative position in which the supporting frame extends transverse to the direction of travel with front and rear wheels, the angles of rotation of said wheels being settable about upwardly extending axes at positions at least 90° apart and said wheels being pivoted to the supporting frame with corresponding arms, spaced apart linkages interconnecting said frame portions with said supporting frame, said frame portions together with their soil working members being vertically displaceable relative to said supporting frame during operation, a front two of said ground wheels being located in front of the supporting frame and a rear two of said wheels located at the rear side of that frame, with respect to the direction of operative travel, the axes of rotation of the front wheels and the rear wheels being respectively coincident when in said positions, said two rear wheels being spaced further from the longitudinal center line of said supporting frame than the two front wheels, during operative travel coupling means adjacent one end of the supporting frame for connection to a prime mover for moving said harrow during transport.

2. An implement as claimed in claim 1, wherein a supporting roller is pivoted to the implement at the rear of said frame portion, with respect to the direction of operative travel and said roller is upwardly and downwardly pivotally adjustable in position relative to said frame portion to control the working depth of said soil working members.

3. An implement as claimed in claim 2, wherein an adjusting mechanism interconnects the roller with the frame, said mechanism comprising a hook releasably connectable to a beam of said supporting frame and a rod that is releasably connectable to said roller, said rod being threaded to block means and being upwardly and downwardly adjustable relative to said supporting frame.

4. A harrow as claimed in claim 1, wherein the front wheels are in alignment with corresponding rear wheels and their respective arms are linked to one another.

5. An implement as claimed in claim 4, wherein said stop means comprises arm assemblies that interconnect the frame portion to said supporting frame, an arm of each assembly having a slot and a bracket with pin being secured to the supporting frame, said pin being entered through said slot to enable the frame portion to move relative to said supporting frame within the slot, pivotably mounted latches on said assembly co-operating with said bracket and being positioned to limit the downward displaceability of said frame portion relative to the supporting frame.

6. A harrow as claimed in claim 4, wherein each of said portions are linked to the supporting frame by spaced apart parallelogram linkages and stop means on said frame limits the displacement of each portion on said linkages relative to the supporting frame.

7. A harrow as claimed in claim 6, wherein said stop means includes at least one arm assembly for each frame portion, said assembly interconnecting the rear of said portion to a beam of the supporting frame.

8. A rotary harrow comprising a frame and a plurality of soil working members rotatably mounted on said frame and driving means connected to rotate said members, said soil working members being arranged in two adjoining groups, each group being carried by a corresponding hollow frame portion, an elongated supporting frame overlying the frame portions and means linking the frame portions to said supporting frame, said harrow being positionable in an operative position in which the supporting frame extends transverse to the direction of travel with front and rear wheels, the angles of rotation of said wheels being settable about upwardly extending axes and said wheels being pivoted to the supporting frame with corresponding arms, spaced apart linkages interconnecting said frame portions with said supporting frame, said frame portions together with their soil working members being vertically displaceable relative to said supporting frame during operation, two of said ground wheels, as seen in plan, being located in front of the supporting frame and a further two of said wheels located at the rear side of that frame, with respect to the direction of operative travel, the arms of the two front wheels being interconnected to corresponding arms of the two rear wheels and extending in alignment with one another, said front wheels being in register with the corresponding rear wheels when the implement is viewed in plan.

9. A harrow as claimed in claim 8, wherein an arm of each front wheel is interconnected to an arm of the corresponding rear wheel by a respective piston and cylinder assembly, said assembly extending generally parallel to the connecting arms and in the direction of operative travel, said assembly being positioned to pivot said arms and raise the frame structure, together with frame portions and working members, into an elevated transport position.

10. A harrow as claimed in claim 9, wherein said wheels are pivotable and the frame displaceable into a transport position wherein the longitudinal center line of the frame extends in the direction of transport travel.

11. A harrow as claimed in claim 9, wherein each front wheel arm and rear wheel arm have respective stop members that bear on said frame to limit the downward movements of those arms.

* * * * *